Feb. 16, 1954

R. W. EDMONDS 2,669,691

BROAD BAND TESTING

Filed May 1, 1951

INVENTOR
R. W. EDMONDS
BY H. A. Burgess
ATTORNEY

Patented Feb. 16, 1954 2,669,691

UNITED STATES PATENT OFFICE 2,669,691

BROAD BAND TESTING

Robert W. Edmonds, Lake Mohawk, N. J., assignor to Bell Telephone Laboratories, Incorporated, New York, N. Y., a corporation of New York Application May 1, 1951, Serial No. 223,875

8 Claims. (Cl. 324—57)

Figures 1, 2:
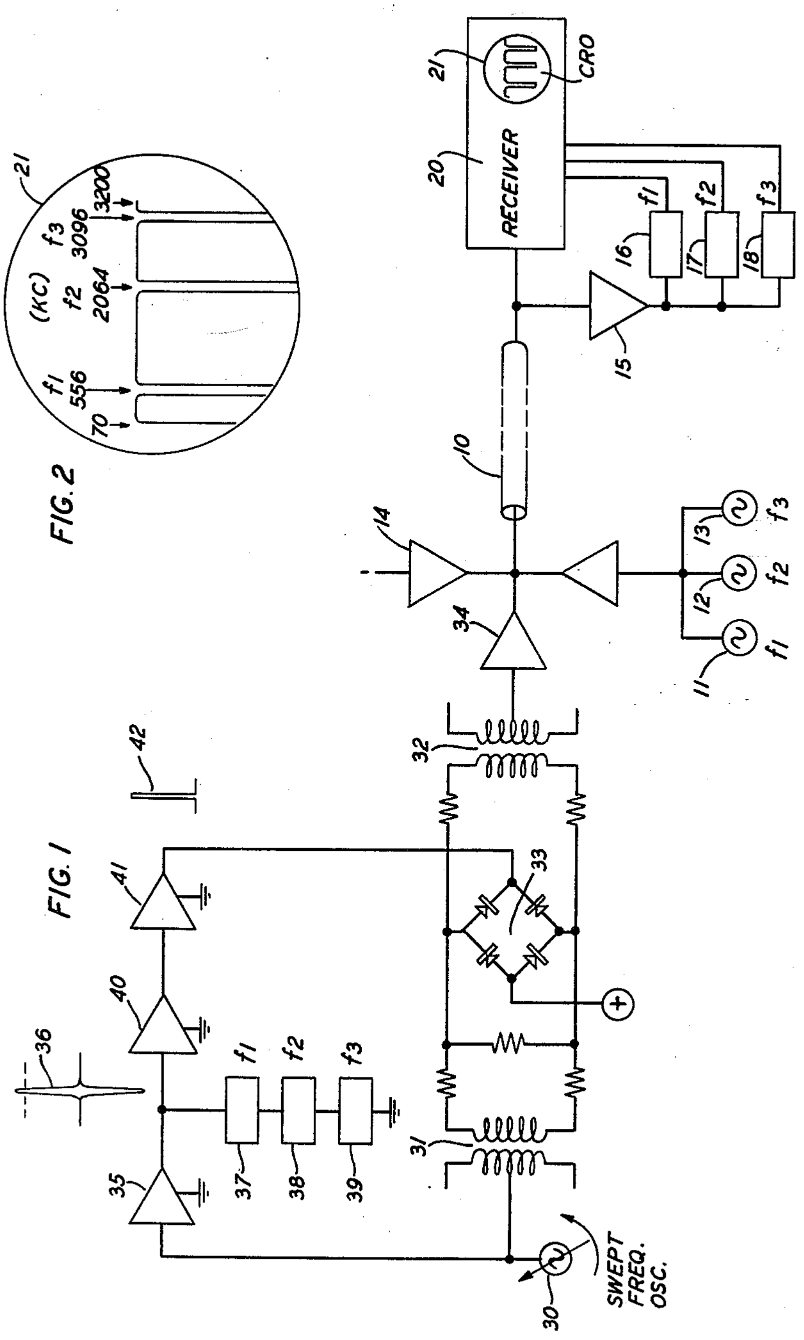

The present invention relates to broad band transmission or testing and more particularly to the use of a wave of swept frequency for testing or measuring.

A general object of the invention is to simplify and improve upon the testing, measuring or lining up of a broad band transmission system.

A further object of the invention is the production or transmission of a wave of swept frequency with a squelch at one or more frequencies in the swept band.

A further object is to produce a swept frequency wave and to provide a marking squelch in the wave at a predetermined frequency of narrower width and sharper edges than is practical to obtain with direct filtering.

The particular problem which lay back of the making of the invention was the lining up of a coaxial line over its broad transmission band in connection with television or other signal transmission. The presence of pilot frequencies on the line for automatic transmission control purposes made objectionable the use of a swept wave covering the transmission band because of interference with the automatic transmission controls by the swept frequency wave when it passed through the frequency of one of the pilot waves. Attempts to use a swept wave of relatively low amplitude in order to minimize such interference were not successful.

This problem was solved in accordance with the invention by introducing narrow frequency gaps in the swept frequency wave at each of the pilot wave frequencies by reducing the amplitude of the swept wave at the pilot wave frequencies to a level too low to affect the automatic transmission controls.

In accordance with a feature of the invention, these gaps are made to have narrower frequency breadth and sharper sides than would be practicable with a directly inserted suppression filter or shunt resonator. In accordance with this feature a gate is inserted in the path of the swept frequency waves and is operated by a short sharp pulse to introduce high loss into the path at the proper instant of time to suppress the wave at the desired frequency.

The invention together with its various objects and features will more fully appear from the following detailed description taken in connection with the drawings in which:

Fig. 1 is a schematic circuit diagram of a transmission system to which the invention is applied; and Fig. 2 is a representation of a transmission pattern typical of what may be obtained by the use of the invention.

Referring to Fig. 1, the transmission line to which the invention is shown as applied is represented as a coaxial conductor 10 extending from the transmitting station at the left to the receiving station at the right. It will be understood that the line 10 may in accordance with usual practice, include a number of mid-line repeaters at suitably spaced points, none of which however is shown in the drawing.

In order to control transmission apparatus associated with the system, it is common to transmit over the line 10 a number of pilot waves. Sources of three such pilot waves are shown for illustration at 11, 12 and 13, operating at frequencies $f1$, $f2$ and $f3$, respectively. One of these pilot frequencies, $f2$, for example, might be used to regulate the gain of each of the repeaters (not shown) in the line 10 and also a final repeater in the receiver. The other two pilot waves $f1$ and $f3$ might be employed only at certain intermediate repeaters, such as at every tenth repeater point, on the line 10 and at the receiver for shaping the transmission characteristic in a different manner from, or to a further extent than, the shaping given by the main pilot wave $f2$.

The manner in which the pilot waves are taken off the line 10 for utilization is illustrated in connection with receiver 20 where a branch path leads through amplifier 15 to the three filters 16, 17 and 18, each of which is made sharply selective to a different pilot frequency $f1$, $f2$ or $f3$. These pilot waves are thus separated into different circuits and are brought into the receiver where they may exercise their particular controls on amplifiers or on transmission networks within the receiver.

At the transmitter a signal branch is shown leading through amplifier 14 to the input end of the cable 10 for applying to the cable whatever signaling waves are to be sent over the line to the distant station. These signals may comprise, for example, television, multiplex telephone or other type.

In accordance with this invention, it is desirable to transmit through the system a wave of swept frequency for testing or lining-up purposes. For this use a swept frequency oscillator is shown at 30 for generating waves increasing in frequency at a linear rate over the entire transmission range of the system and repeating this process at a suitable rate, such as fifty sweeps per second. At the end of a sweep, the frequency may be quickly returned to its original value. In an illustrative case the frequency range covered may be from 50 kilocycles to 3150 kilocycles.

One branch from the oscillator 30 leads through transformers 31 and 32 and amplifier 34 to the coaxial cable 10. A loss device consisting of varistors in bridge configuration is shown at 33 shunted across the circuit at a point between the transformers 31 and 32, for introducing high loss into the circuit at proper instants of time for squelch purposes.

A second output branch from the oscillator 30 leads to a control circuit for the squelch comprising an amplifier 35 the output of which has shunted across it three sharply tuned parallel-resonant circuits 37, 38 and 39 tuned respectively to frequencies $f1$, $f2$ and $f3$. Whenever the swept frequency wave passes through frequency $f1$, the antiresonant circuit 37 introduces a high impedance into the control circuit resulting in the application of a pulse having a narrow envelope such as shown at 36, to the input of amplifier-rectifier 40. The same thing happens when the frequency of the swept frequency wave reaches frequency $f2$ and frequency $f3$. Thus for one complete sweep, three sharp pulses 36 are applied to the amplifier-rectifier 40. This amplifier-rectifier is provided with a large negative bias so as to clip the pulse 36 at a point near its peak, as shown by the dotted line, and allow only a very short sharp pulse to pass into the amplifier 41. Amplifier 41 may comprise more than one stage and includes suitable shaping circuits, in themselves known in the art, to produce an output pulse shaped like that shown in 42, which is of short duration, high amplitude and square-shape. This pulse is applied to one diagonal of the bridge 33 and biases the varistors in the bridge in the proper direction and extent to cause the bridge 33 to appear as a practical short circuit across the line for the duration of the pulse.

In this manner the swept frequency wave is squelched when it passes through each of the frequencies $f1$, $f2$ and $f3$. Fig. 1 of the drawing shows a cathode ray oscilloscope at 21 in the receiver 20 and in a general way the character of the trace produced on the screen. An enlarged view of this trace is shown in Fig. 2. It is assumed for illustration that $f1$, $f2$ and $f3$ are respectively 556 kilocycles, 2064 kilocycles and 3096 kilocycles, and that the trace extends from 70 kilocycles to 3200 kilocycles. It will be noted that narrow gaps are produced in the trace centered about the three pilot frequencies. The sweep generator for the cathode ray oscilloscope 21 can be synchronized to the received wave by generating the usual type of direct current synchronizing pulse from a resonant circuit (not shown) in the receiver acting in the same way as one of the tuned circuits 37, 38 and 39 at the transmitter, in conjunction with a suitable rectifier and amplifier (also not shown). This resonant circuit may, for example, be tuned to a frequency corresponding to mid-scale reading.

In practice the swept-frequency wave arrives at the receiver at a level somewhat above that of the pilot waves so that slots will appear in the oscilloscope trace at the pilot frequency regions. It is assumed that the oscilloscope gain is high so as to indicate small deviations in line characteristic, and that the pilots are too far down in level to show on the scope although, of course, with a different relationship and different adjustments they might appear.

The slots in the trace furnish convenient frequency marks which can be used as scale markers.

In the use of the system, a cathode ray oscilloscope, such as indicated at 21, may be employed at each attended repeater point along the line and at the receiver. Attendants observing the pattern produced on the screen, may manipulate the necessary controls to bring the transmission characteristic to its desired shape for signal transmission purposes. For example, in lining up the system from time to time, such as once a day, this type of procedure may be employed. There is no interference with the automatic regulating equipment since the frequencies in the transmitted swept frequency wave corresponding to the pilot frequencies are effectively eliminated before transmission.

One advantage in the use of a bridge type network at 33 is that the control pulse is applied to points which are in conjugate relation to the line so that none of the waves in the pulse control circuit are transmitted to the line.

The swept frequency oscillator may be of any suitable known type and may, for example, comprise a vacuum tube oscillator, a reactance tube and a saw tooth wave generator of the multivibrator type, the output of which is applied to a reactance tube used to control the frequency of the vacuum tube oscillator, such an arrangement being well known in the art. An automatic volume control of known type (not shown) may be used to maintain the output of the generator constant.

Instead of the varistor type loss circuit inserted between transformers 31 and 32, any other suitable type of gate circuit can be used, which is capable of introducing a sufficiently high loss into the circuit in a sufficiently short time under control of pulse 42.

One advantage of using a gating circuit controlled by pulse 42 is that the loss can be introduced and withdrawn more suddenly than would be the case if a resonant circuit were directly shunted across the line. This is due to the fact that while the resonant circuit might have a characteristic such as to give a pulse shaped like that shown in 36, the gate control pulse can be generated from the peak portion of the curve and, moreover, can be suitably shaped before application to the gate. The width of the gating pulse can be controlled by adjustment of the bias used in amplifiers 40 and 41, or other elements of the control circuit.

The invention is not to be construed as limited to the details of the circuits or values of the frequencies disclosed since these are intended as illustrative and not as limiting.

What is claimed is:

1. In combination with a broad band transmission circuit having means to transmit a single frequency within the band, a source for transmitting waves of swept frequency over said circuit, said waves periodically sweeping over all of said band except for a narrow frequency gap including said single frequency, a gate normally in a low loss or transmitting condition, connected in said circuit in the path of said waves, means to derive from the waves generated by said source a gating pulse at the instant in the sweep at which the swept frequency passes through said narrow gap and means to utilize said pulse to operate said gate to a high loss condition.

2. In combination, a transmission circuit, an oscillation generator for producing waves cyclically varying in frequency, means for supplying one energy portion of the produced waves to said circuit, a gate in said circuit in the path of the supplied waves, normally in a low loss or transmitting condition, a resonant element having a resonant frequency within the range of frequency variation of the waves from said generator, means to apply a second energy portion of the generated waves to said element, means including said element for producing a pulse each time the frequency of the applied waves coincides with the resonant frequency of said element and means to utilize said pulse to operate said gate to its high loss or suppressing condition.

3. The combination according to claim 2, including a clipping circuit associated with said element for utilizing only the peak portion of the resonant curve of said element in the production of said pulse and shaping means for rendering the pulse substantially rectangular in shape.

4. The combination with a transmission path having provision for transmitting thereover one or more pilot frequency waves for control purposes, of a swept frequency wave generator connected to said path and producing waves having frequencies extending over a wide band inclusive of the frequencies of the pilot waves and means for effectively blanking the generator output each time the frequency of the produced waves coincides with the frequency of a pilot wave.

5. The combination according to claim 4, in which the blanking means comprises a gate located between said generator and said path, means to derive a wave from the generator output coinciding in frequency with a pilot wave frequency and means to produce under control of the derived wave a pulse for activating said gate.

6. In combination, a swept frequency oscillation generator for producing waves cyclically varying in frequency over a wide range, a wave receiver, a transmission path connecting the output of said generator to said receiver and means for blanking from said receiver at all times certain frequencies in the output wave from said generator comprising a resonant element coupled to said generator, a gating circuit in said transmission path and a gate control pulse circuit triggered from said resonant element in response to said certain frequencies in the swept-frequency waves from said generator for operating said gating circuit to substantially prevent transmission of said certain frequencies over said path to said receiver.

7. Broad band measuring equipment for a circuit carrying currents of individual frequencies at separated points in the transmission frequency range, comprising means to sweep all of the transmission frequency range continually except for narrow regions around said individual frequency points, said means including a swept frequency oscillator for generating and supplying to said circuit waves cyclically varying in frequency over said range, a variable loss device in said circuit in the path of the supplied waves for controlling their amplitude, a circuit controlled from the output of said generator for producing a pulse each time the generated wave coincides in frequency with one of said points, and means under control of said pulse for increasing the loss of said variable loss device so as to substantially suppress transmission therethrough of waves from said generator for the duration of said pulse.

8. The combination with a transmission path having provision for transmitting thereover one or more pilot waves of different frequencies for control purposes, of a swept frequency wave generator connected to said path for producing and supplying thereto waves having frequencies extending over a wide band inclusive of the frequencies of said pilot waves and means for substantially reducing the generator output each time the frequency of the produced wave coincides with the frequency of a pilot wave.

ROBERT W. EDMONDS.

References Cited in the file of this patent

UNITED STATES PATENTS

| Number | Name | Date |
|---|---|---|
| 2,297,393 | Deserno | Sept. 29, 1942 |
| 2,304,635 | Ferguson et al. | Dec. 8, 1942 |
| 2,509,365 | Parmentier | May 30, 1950 |
| 2,534,957 | Delvaux | Dec. 19, 1950 |
| 2,558,886 | Taylor et al. | July 3, 1951 |
| 2,600,973 | Comte | June 17, 1952 |